United States Patent
Chen

(10) Patent No.: US 6,373,840 B1
(45) Date of Patent: Apr. 16, 2002

(54) STACKABLE NETWORKING DEVICE AND METHOD HAVING A SWITCH CONTROL CIRCUIT

(75) Inventor: Chia-Hsiou Chen, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 09/042,458

(22) Filed: Mar. 16, 1998

(30) Foreign Application Priority Data

Nov. 28, 1997 (CN) ......................................... 86117975 A

(51) Int. Cl.[7] ............................. H04Q 11/00; H04J 1/10
(52) U.S. Cl. ........................................ 370/360; 370/492
(58) Field of Search ................................ 370/256, 445, 370/446, 401, 402, 492, 360, 463

(56) References Cited

U.S. PATENT DOCUMENTS

| | | | |
|---|---|---|---|
| 4,780,714 A | * 10/1988 | Moustakas et al. | 340/825.5 |
| 5,610,903 A | * 3/1997 | Crayford | 370/213 |
| 5,715,287 A | * 2/1998 | Wadhawan et al. | 375/377 |
| 5,805,816 A | * 9/1998 | Picazo, Jr. et al. | 395/200.53 |
| 6,047,001 A | * 4/2000 | Kuo et al. | 370/428 |
| 6,055,241 A | * 4/2000 | Raza et al. | 370/445 |
| 6,065,038 A | 5/2000 | Chen | |
| 6,069,897 A | * 5/2000 | Perlman et al. | 370/420 |
| 6,072,803 A | * 6/2000 | Allmond et al. | 370/445 |
| 6,084,856 A | * 7/2000 | Simmons et al. | 370/235 |
| 6,141,352 A | * 10/2000 | Gandy | 370/463 |

* cited by examiner

Primary Examiner—Dang Ton
Assistant Examiner—Toan Nguyen

(57) ABSTRACT

A switch control circuit is provided in a dual speed stackable networking device for automatically bypassing a faulty exchanging unit and monitoring the voltages of the associated input end and output end to prevent the occurrence of a traffic loop. When a number of dual-speed hubs are arranged in a stack, the output end of the current switch control circuit is coupled to the input end of a switch control circuit of next adjacent dual-speed hub. On the other hand, the output end of the current switch control circuit is coupled to the input end of a switch control circuit of another adjacent dual-speed hub. The switch control circuit includes a detector for detecting the power status of the exchanging unit, a logic unit for controlling the voltages of the input end and the output end. If the exchanging unit is not functioning normally, and the voltage of the output end is set to 0, then the exchanging unit is disabled by the switch control circuit. According to the control of the switch control circuit, each dual speed stackable networking device will be automatically bypassed if it is powered off. The traffic loop can thus be efficiently avoided without having to implement the Spanning Tree Protocol in a CPU.

8 Claims, 4 Drawing Sheets

STACKABLE NETWORKING DEVICE AND METHOD HAVING A SWITCH CONTROL CIRCUIT

FIELD OF THE INVENTION

The present invention relates to a stackable networking device, especially to a dual-speed stackable hub having a switch control circuit for preventing a traffic loop occurred in a stack of the dual-speed stackable hubs.

DESCRIPTION OF THE PRIOR ART

The use of computer networks has gradually increased in industry, commerce, and even in personal applications. The local area network (LAN) connects computers, peripherals, and communication devices, through appropriate links, sharing the resources, sharing information, and exchanging data. Local area networks are commonly used in small and middle-size companies.

FIG. 1 shows the commonly used N number double speed switch hub formed network stacks. Every unit of the stacks has repeaters of different transfer speeds (10 Mbps and 100 Mbps). To transfer data between the ports of the repeaters, two stacks each connect the repeaters of the same speed. Each exchange switch of a unit connects with one 10 Mbps repeater and the 100 Mbps repeater. The ports of the repeaters connect to the ports of other exchange switches of different transfer speeds (such as port I and port J in FIG. 1).

FIG. 1 shows multiple stackable networking devices 13 arranged in a stack. These stackable networking devices 13 are usually referred to as dual-speed Ethernet Hubs. Each of these stackable networking devices 13 has an exchanging unit 14 for automatically exchanging packets between two internal repeaters 11, 12 of 10 and 100 Mbps data transfer rates when a cable is connected to port I or port J. Since there is no communication among these exchanging units 14, so if one of these exchanging units is down, the remaining exchanging units 14 will still keep transmitting packets. It will cause more traffic in the stack buses and waste the bandwidth of the networking device 13. Moreover, when broadcast packets are sent to the stack of the stackable networking devices 13, a traffic loop is likely to be formed in the stack. The traffic loop causes more traffic in the bandwidth of the dual-speed Ethernet hubs and thus congests the networks.

A conventional method for solving the traffic loop problem is to perform a Spanning Tree Protocol by implementing a Central Process Unit (CPU) in each exchanging unit 14. However, the implementation of a CPU will inevitably increase the cost of the dual-speed Ethernet Hub.

SUMMARY OF THE INVENTION

It is an object of the present invention to provide a dual-speed stackable networking device capable of preventing a traffic loop by implementing a switch control circuit in the stackable networking device.

It is another object of the invention to provide a cost-effective dual-speed stackable networking device which can save the cost of CPU by implementing a simple switch control circuit for controlling the operations of the exchanging unit.

A first stack bus connects with all the first signal repeaters of every dual-speed stackable networking device, to exchange data between the first repeater of every dual-speed stackable working device. A second stack bus connects with all of the second repeaters of every dual-speed stackable net working device, to exchange data among the second repeaters of each dual-speed stackable networking device. One switch control circuit is added to each dual-speed stackable networking device, which includes some switch control circuits connected to the same switch control circuit of the other dual-speed stackable networking device. These circuit units switch control circuit have an output end for sending a high or low voltage signal to the next circuit unit of the other switch control circuit. It has an input end for receiving a high or low voltage signal from the other switch control circuit and a detector connected with the exchanging unit. The switch control circuit generates a high voltage signal when the exchange switch is on. A logic unit is connected with the input end, and the detector and exchanging unit. When the signal from the input end is low and the signal from the exchanging unit is high, the logic unit generates a high volume signal to the output end and makes the next exchanging unit on. It generates a low voltage signal to the next exchanging unit and turns the next exchanging unit off, when the signal from the input end is high.

The repeaters of the above-mentioned design are typically either of transfer speed of 10 Mbps or 100 Mbps. The stack buses of the switch control circuit typically have transfer data rates of 10 Mbps or 100 Mbps.

The logic unit, as described above, has the following components: an and/or gate connects the input end of the switch control circuit and the output of the detector. When it receives a high voltage signal from the input end or from the detector, it sends out a high voltage signal. One Normally Open Mechanical Relay connects with the input end and output end of the switch control circuit. The Relay is open when the exchanging unit is on, and it is closed when the exchanging unit is off. The Relay transfers the signal from the input end to the output end when the exchanging unit is off.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be more fully understood by reference to the following detailed description thereof when read in conjunction with the attached drawings which are given by way of illustration only, and thus are not limitative of the present invention, and wherein.

DETAILED DESCRIPTION OF THE PREFERRED EMBODIMENT

Figure 1:
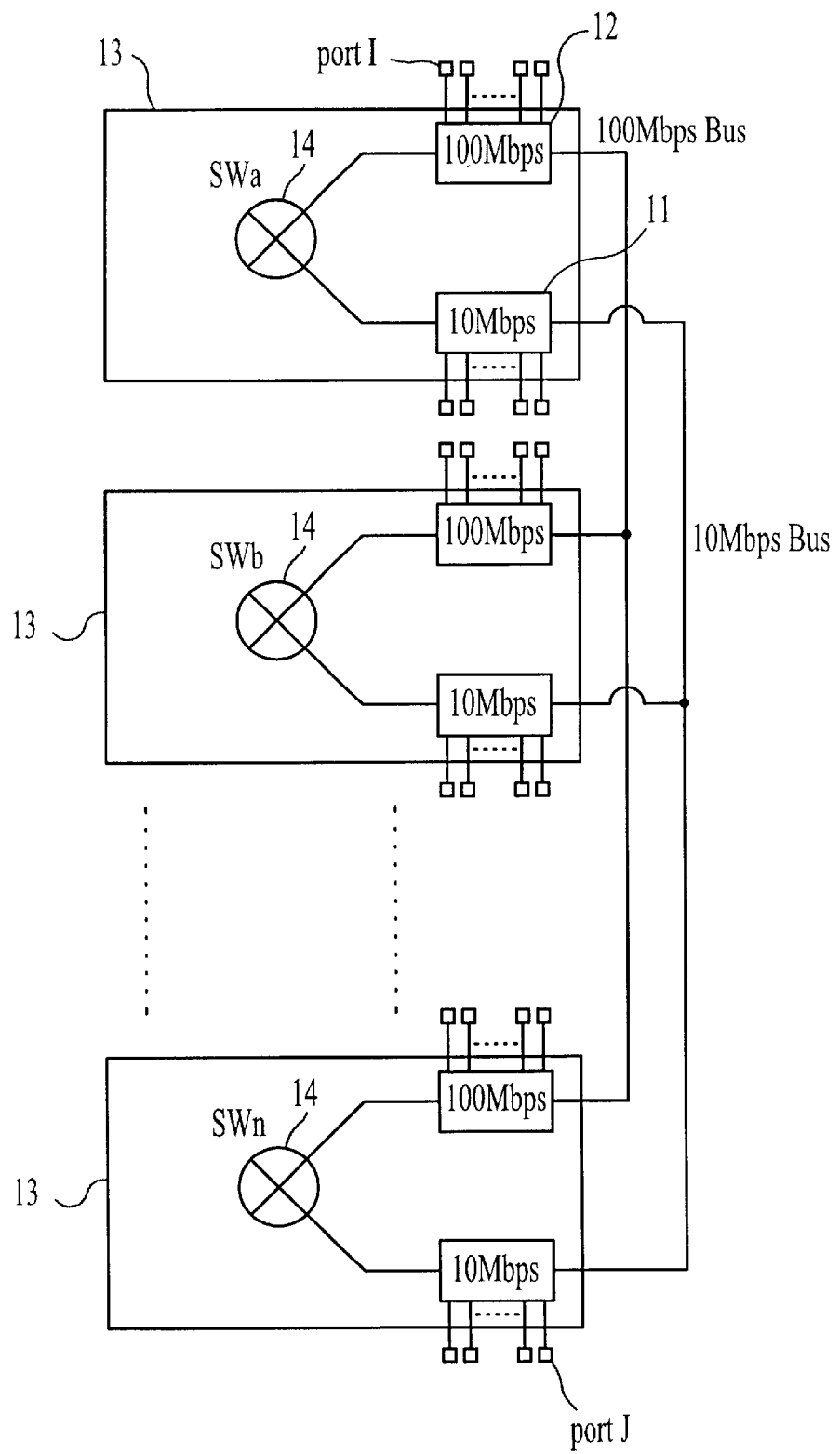
FIG. 1 is a schematic diagram showing the structure of conventional dual-speed stackable Ethernet Hubs when arranged in a stack.
Figure 2:
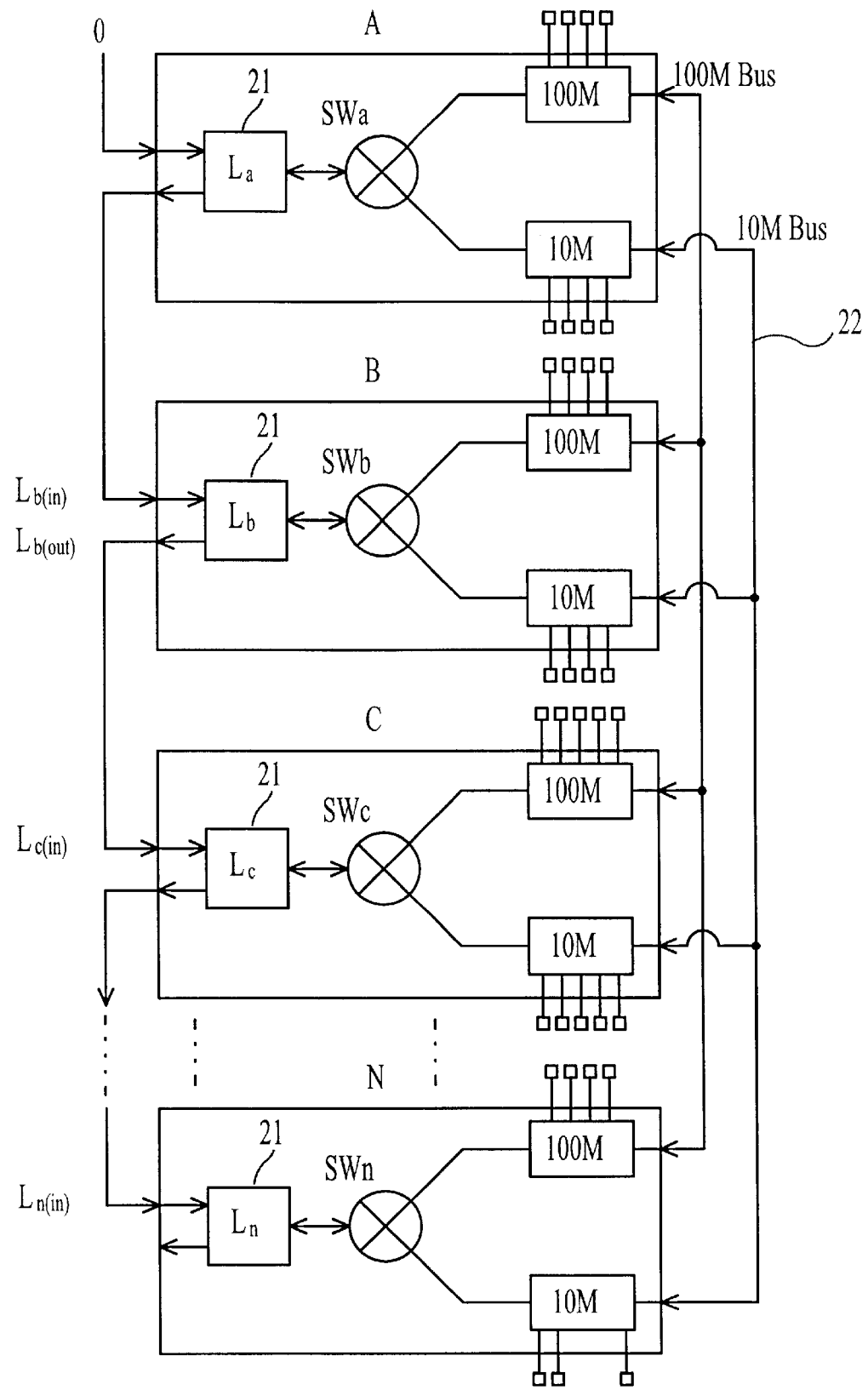
FIG. 2 is a schematic diagram showing the structure of dual-speed stackable Ethernet Hubs having a switch control circuit according to a preferred embodiment of the present invention.

FIG. 2 shows a preferred embodiment of the present invention. The dual-speed stackable networking devices are arranged as a stack by sequentially connecting a number of N dual-speed stackable hubs. In comparison with the structure of that as shown in FIG. 1, the new structure of FIG. 2 includes a switch control circuit 21 for connecting to its adjacent stackable networking device in addition to the repeaters of 10 Mbps and 100 Mbps data transfer rates, an exchanging unit (SWa~SWn), and stack buses 22 for transmitting packets of the two repeaters. The exchanging unit (SWa~SWn) is enabled/disabled in response to the control of associated switch control circuit (La~Ln) 21.

Figure 3:
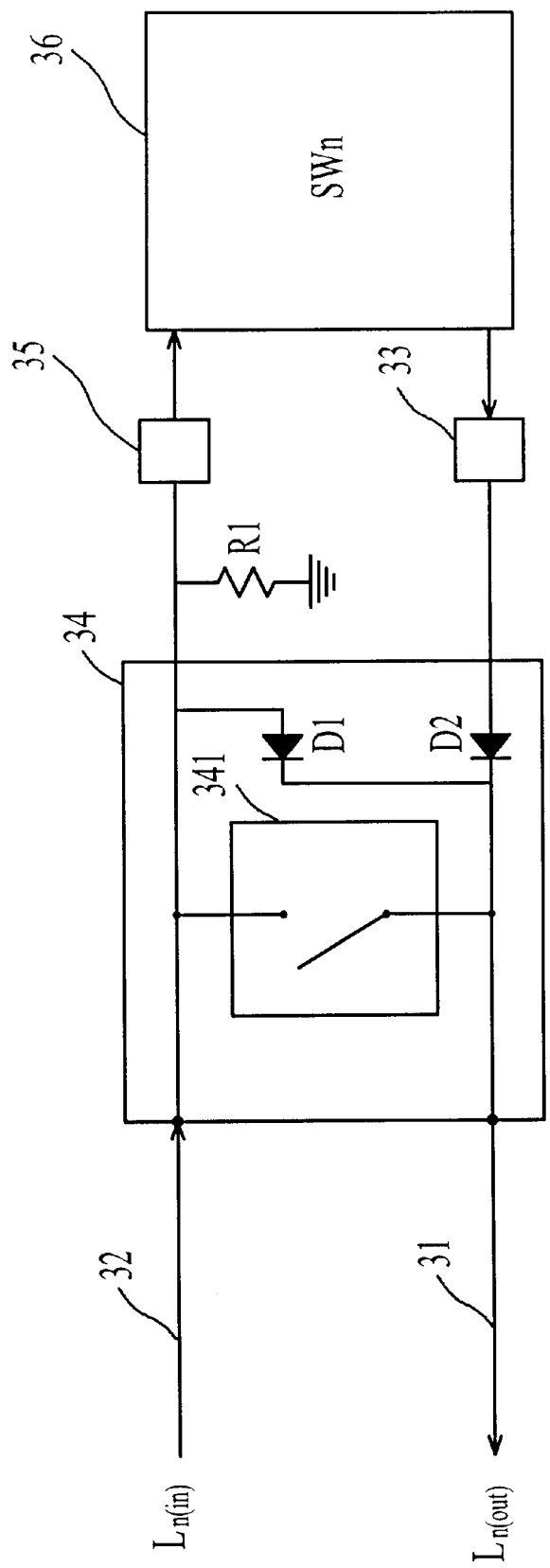
FIG. 3 is a circuit diagram of the switch control circuit of a dual-speed stackable Ethernet Hubs according to a preferred embodiment of the present invention.

FIG. 3 is a circuit diagram of the switch control 21 according to a prefered embodiment of the present invention. An output end 31 of the switch control circuit (Ln) 21 is connected to the input end of a switch control circuit (Ln−1) of a first adjacent stackable networking device. And an input 32 is connected to the output end of the switch control circuit (Ln+1) of a second adjacent stackable networking device. If the dual-speed stackable networking device is placed on top of the stack, the input end recives a low voltage because it does not connect to any device. The detector 33 connects to an exchanging unit SWn 36. When exchanging unit SWn 36 is on, it outputs a high voltage signal (logic 1). When exchanging unit SWn 36 is off or failed, it outputs a low voltage signal (logic 0). Logic unit 34 is formed by diode D1, D2 and the Normally Open Mechanical Relay 341. The diodes D1 and D2 together form the and-or-gate to generate the voltage for the input end 32 and the voltage for the output end 31. The Normally Open Mechanical Relay 341 is open when the exchanging unit SWn 36 is on and it is closed when the exchanging unit SWn 36 is off, so that it transfers the voltage signal from input end 32 to output end 31 then to the input end of the next exchanging unit. The enabling/disabling end 35 connects with the Rx Data Valid end of the exchanging unit SWn 36. It can transfer a high voltage signal (logic 1) or a low voltage signal (logic 0) to the exchanging unit SWn 36. This controls the initiation or closing function of the exchanging unit SWn 36. The resistance R1 is pull low resistance, which parallel connects with initiation and close controlling end. The resistance should be properly managed to sufficiently pull up the voltage of the input end 32 to high voltage. However, the resistance cannot be so high that it causes the voltage of the enabling/disabling end 35 lower than 0.8 Volt. In that case, the voltage will not be sufficient enough to enable/disable the exchanging unit SWn 36.

The Rx Data Valid end of the exchanging unit 36 is an control end for enabling/disabling the exchanging unit 36, but not for controlling the power of the exchanging unit 36. When an exchanging unit is disabled or powered-off, a backup exchanging unit 36 can replace the role of the original exchanging unit immediately. Thus, the exchanging unit 36 can be automatically enabled or disabled without having to reset the dual-speed hub. Accordingly, due to the control of the switch control circuit 21, the dual-speed stackable hub can prevent from the problem of packet losses. The present invention can thus efficiently prevent the occurrence of a traffic loop without using a CPU to perform a Spanning Tree Protocol.

Figure 4:
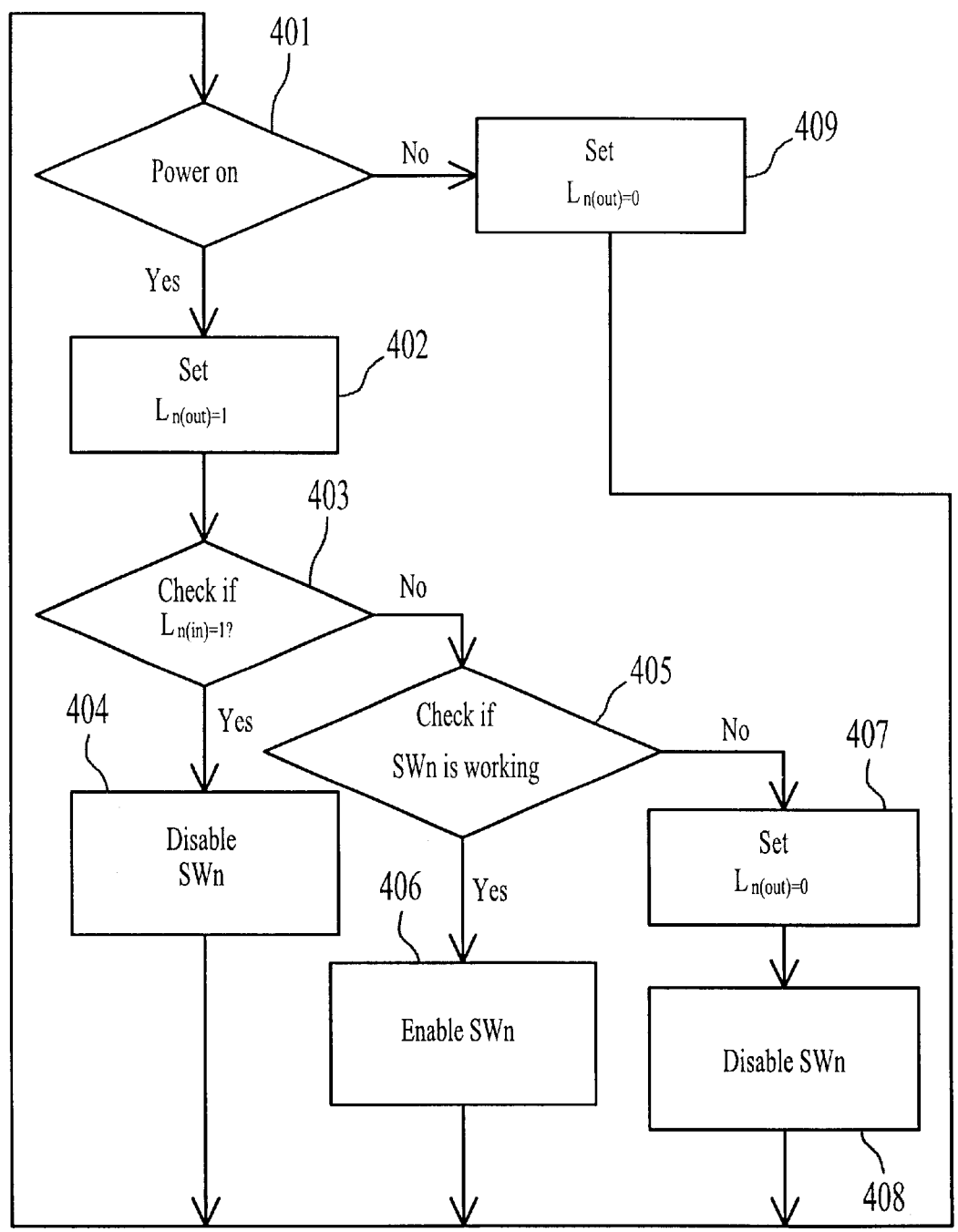
FIG. 4 is a control flowchart of the switch control circuit according to a preferred embodiment of the present invention.

FIG. 4 shows the operation of the switch control circuit 21 when a number of the dual-speed hubs are arranged in a stack. Refer to FIG. 4 and FIG. 3 for showing the operations of the switch control circuit 21.

Step 401: The detector 33 checks if the power of an associated exchanging unit is powered on? If yes, go to step 402. If not, go to step 409 to set the voltage of the output end to zero.

Step 402: Set the voltage of the output end to 1, Ln(out)=1. And go to step 403.

Step 403: check if the voltage of the input end is equal to 1, Ln(in)=1? If yes, go to step 404. If not, go to step 405.

Step 404: To avoid the traffic loop formed between the adjacent exchanging unit and the current exchanging unit, disable the current exchanging unit and then go to step 401 to continue monitoring the voltages of the input end and output end.

Step 405: check if the current exchanging unit is working? If yes, go to step 406. If not, go to step 407.

Step 406: Since there is no traffic loop occurred between two adjacent dual-speed stackable hubs and the current exchanging unit is functioning normally, so enable the exchanging unit of the current dual-speed stackable hub. And then, go to step 401.

Step 407: Since the exchanging unit of the current dual-speed stackable hub is not working, so set the voltage of the output end to zero, Ln(out)=0 and then go to step 408 to disable the current exchanging unit. And then, go to step 401.

This invention saves the central processing unit (CPU) in every exchange switch Swa, SWb, - - - SWn used by general method, which performs the Spanning Tree Protocol. The invention provides a switch control circuit to coordinate with the switch control circuit of each adjacent dual-speed hub by detecting the status of a current exchanging unit and the voltages of an input end and an output end of a current switch control circuit. As a result, a traffic loop will not occurred. Moreover, the switch control circuit is simple and easy to implement, thereby to save the manufacturing cost of the dual-speed stackable hub.

The foregoing drawings and description of the invention are for illustration only. Modifications not included in the description which are obvious to those skilled in the art are intended to be included in the scope of the following claims.

I claim:

1. A dual-speed stackable networking device comprising:
   a first repeater connecting to a port of a first data transfer rate;
   a second repeater connecting to a port of a second data transfer rate;
   an exchanging unit connected to said first repeater and said second repeater for automatically exchanging packets between said first repeater and said second repeater; and
   a switch control circuit (Ln) for enabling/disabling said exchanging unit in response to voltage of an input end and a power status of said exchanging unit, the switch control circuit comprising,
   means for detecting a power status of said exchanging unit to determine if said exchanging unit is powered-on and setting an output voltage of said switch control circuit to high when said exchanging unit is powered-on and setting said output voltage of said switch control circuit to low when said exchanging unit is powered-off, and
   means for enabling/disabling said exchanging unit in response to an input voltage of said switch control circuit, the means for enabling/disabling will disable said exchanging unit when said input voltage of said switch control circuit is high.

2. The dual-speed stackable networking device as claimed in claim 1, wherein said switch control circuit (Ln) having an output end connects to an input end of a switch control circuit (Ln+1) of a first adjacent stackable networking device, and said input end connects to an output end of a switch control circuit (Ln−1) of a second adjacent stackable networking device when a plurality of said stackable networking devices is arranged in a stack.

3. The dual-speed stackable networking device as claimed in claim 2, wherein said means for detecting a power status of said exchanging unit when the output voltage is set to the high voltage outputs a signal to said output end when said exchanging unit is powered-on and wherein the means for detecting when the output voltage is set to a low voltage outputs a signal to said output end when said exchanging unit is powered-off;

the means of enabling/disabling said exchanging unit acts in response to a voltage of said input end; and the switch control circuit includes a logic unit for generating a voltage to said output end in response to a voltage of said input end a voltage of said detecting means.

4. The dual-speed stackable networking device as claimed in claim 3, wherein said logic unit comprises:

an AND/OR gate coupled to said input end and said detecting means for generating a voltage signal from said input end and/or said detecting means;

a relay connected to said input end and said output end of said switch control circuit for enabling/disabling the connection between said input end and said output end in response to a voltage signal of said input end a voltage of said detecting means;

wherein said relay is closed when said detecting means detects said switch control circuit is powered-off, and said relay is open when said detecting means detects said switch control circuit is powered-on.

5. The dual-speed stackable networking device as claimed in claim 3, wherein said logic unit further comprises:

a resistor coupled to said enabling/disabling end for controlling the voltage of said input end inputting to said exchanging unit.

6. In a dual-speed stackable networking device having a switch control circuit for controlling an exchanging unit, comprising the steps of:

a. determining if said exchanging unit (Ln) is powered-on;

b. setting an output voltage of said switch control circuit to high when said exchanging unit is power-on and setting said output voltage of said switch control circuit to low when said exchanging unit is powered-off;

c. determining if an input voltage of said switch control circuit is high; and d. disabling said exchanging unit when said input voltage of said switch control circuit is high.

7. The method as claimed in claim 6, wherein following said step (c) further comprising the steps of:

e. determining if said exchanging unit is functioning normally;

f. enabling said exchanging unit when said exchanging unit when is functioning normally.

8. The method as claimed in claim 7, wherein following said step (e) further comprising the steps of:

g. setting an output voltage of said switch control circuit to low when said exchanging unit is not functioning normally; and h. disabling said exchanging unit.

* * * * *